(No Model.) 2 Sheets—Sheet 2.

J. M. CHAMBERS.
APPARATUS FOR HEATING AND DRYING BARRELS OR CASKS.

No. 407,720. Patented July 23, 1889.

WITNESSES
INVENTOR

UNITED STATES PATENT OFFICE.

JAMES M. CHAMBERS, OF ST. LOUIS, MISSOURI, ASSIGNOR TO THE CHAMBERS PATENT BARREL HEATER COMPANY, OF SAME PLACE.

APPARATUS FOR HEATING AND DRYING BARRELS OR CASKS.

SPECIFICATION forming part of Letters Patent No. 407,720, dated July 23, 1889.

Application filed October 27, 1888. Serial No. 289,307. (No model.)

*To all whom it may concern:*

Be it known that I, JAMES M. CHAMBERS, a citizen of the United States, residing at the city of St. Louis, State of Missouri, have invented a certain new and useful Improved Apparatus for Heating and Drying Barrels or Casks, of which the following is a full, clear, and exact description.

My invention relates to the heating and drying of barrels or casks preparatory to the hooping and finishing of same, and is an improvement on that for which Letters Patent have been granted to me bearing date September 7, 1886, No. 348,888, for improved apparatus for heating and drying barrels or casks.

My invention has for its object to effect a more thorough drying of the barrel or cask, and at the same time reduce the consumption of fuel by prolonging the circulation of the heated gases from around the barrel and to direct their escape into the atmosphere toward the upper part of the apparatus instead of at the base thereof, as in my said patent.

It consists in a combination and arrangement of apparatus whereby the barrel or cask is raised into position around the heater, the heat from which is caused to circulate internally and externally around the barrel, which is inclosed by a cylinder or drum, through the lower part of which the heated gases pass upward through an annular space surrounded by an outer drum or casing, and from the upper part of the latter into the atmosphere.

Figure 1:
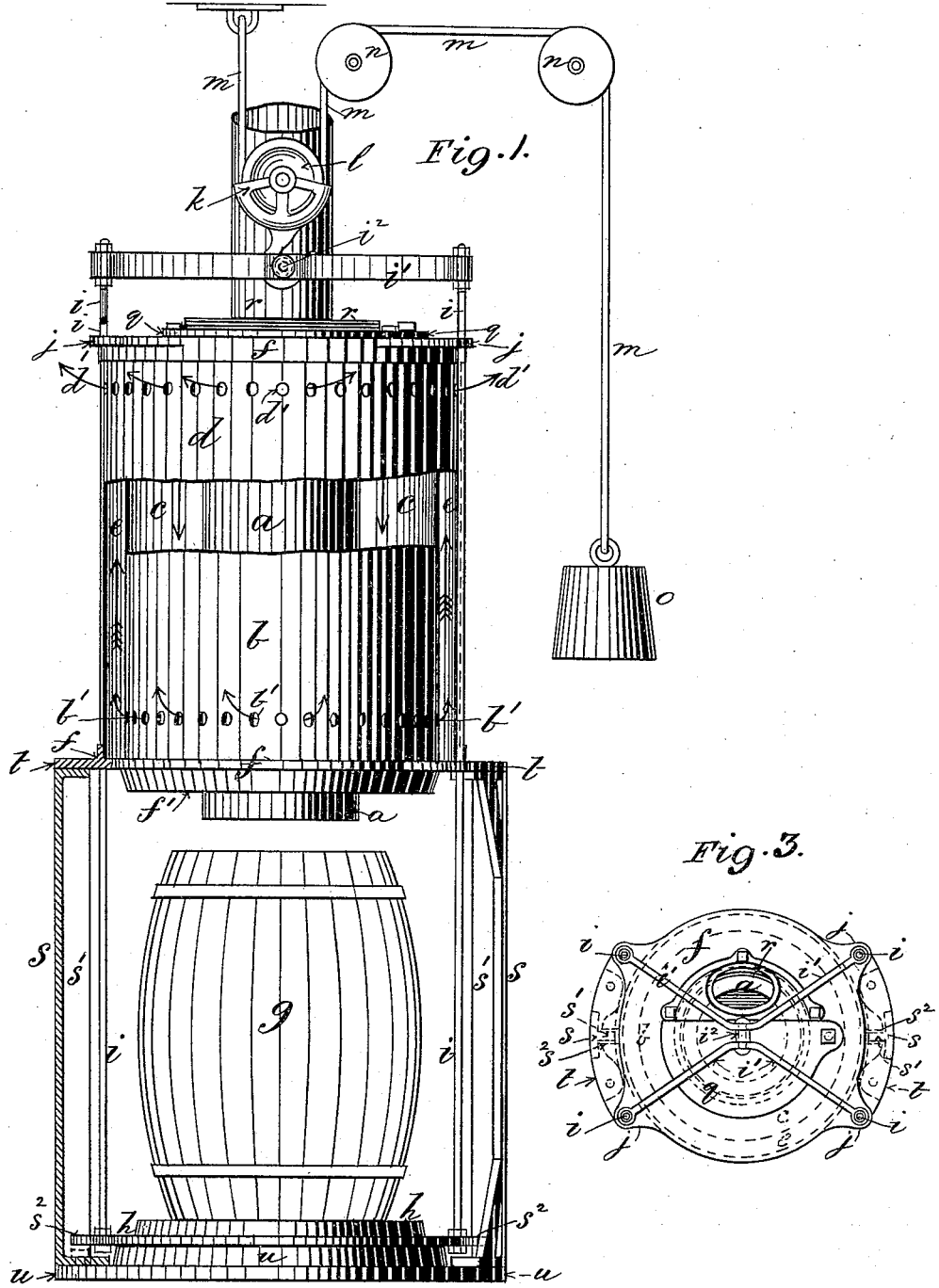
Figure 2:
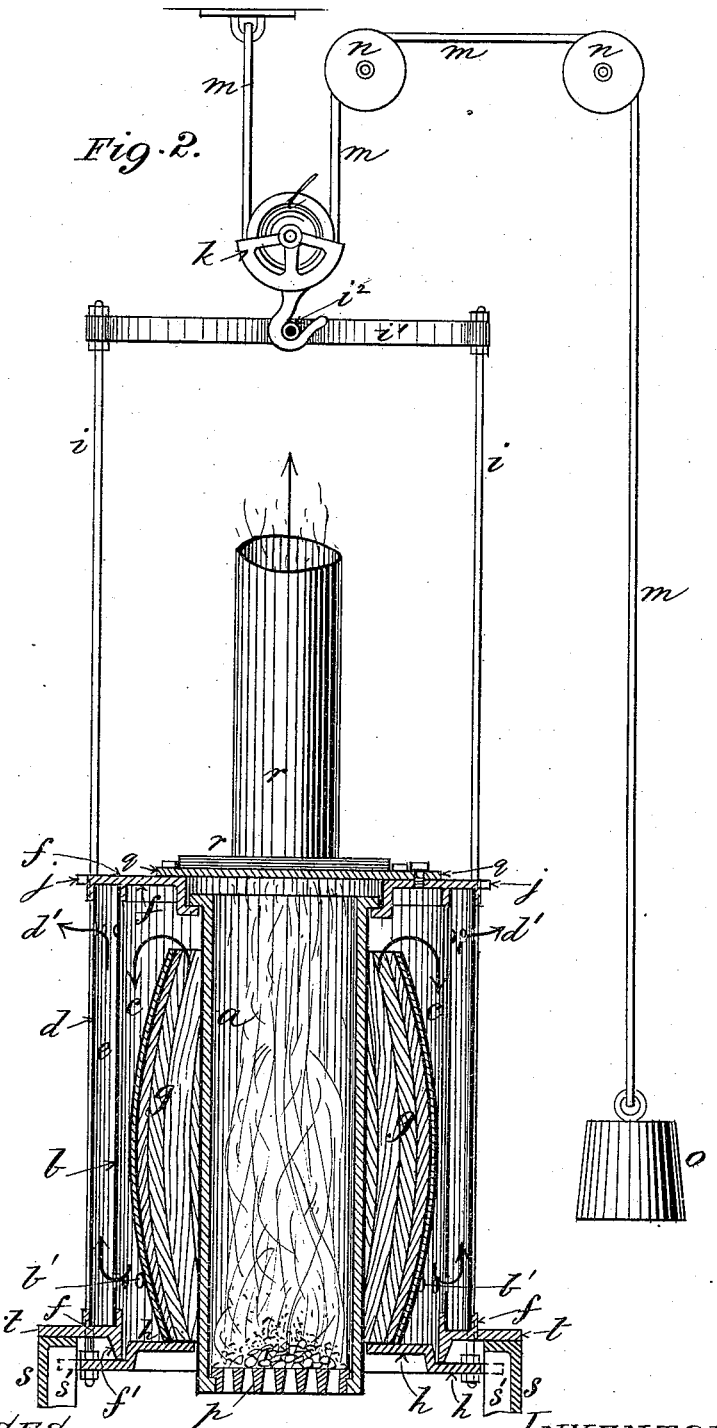

On the accompanying drawings, Figure 1 represents a sectional elevation, partly broken away, of the apparatus comprising my invention, with the barrel or cask lowered away from the heater; Fig. 2, a similar view with the barrel in the raised position for being heated and dried; and Fig. 3, a plan thereof to a reduced scale, omitting the overhead pulleys.

Like letters of reference denote like parts in all the figures.

In carrying out my invention the ordinary cylindrical fire-box or heater $a$, used for drying the inside of barrels, is inclosed within a fixed overhead cylinder or drum $b$, which is open at its lower end and closed at its top, except through its central portion, within which is placed the upper and open end of the fire-box or heater $a$, an annular cylindrical space $c$ being left between the heater $a$ and the cylinder or drum $b$.

Surrounding the cylinder or drum $b$, at a suitable distance therefrom and concentric therewith, is an outer drum or casing $d$, between which and the cylinder or drum $b$ is formed an annular space or chamber $e$, which is closed at both ends by the upper and lower rings or framing $f$, respectively. Through the wall of the cylinder or drum $b$, near its lower end, are openings $b'$, which establish communication between the annular spaces $c$ and $e$, and through the wall of the outer drum or casing $d$, near its upper end, are openings $d'$ into the external air.

Beneath the annular space $c$ the barrel or cask $g$ to be dried is placed in an upright position on a platform $h$, to each side of which are secured the lower ends of rods $i$, which pass freely through lugs $j$ on the circumference of the rings or framing $f$, the rods $i$ being united above the upper ring $f$ by cross-bars $i'$, which are secured together at a suitable distance apart over the center of the upper ring $f$ by a rivet and intervening washer $i^2$, or by a bolt and nut or otherwise, as found most convenient. The cross-head $i'$ thus constructed, carrying the platform $h$, is suspended, preferably at the center, from a pulley-block $k$, having a single sheave $l$, under which passes a rope or chain $m$, fixed at one end to the ceiling or analogous support, while its other end passes over one or more overhead pulleys $n$, and terminates in a counterbalance-weight $o$, which hangs within reach of the operator.

Fuel is fed to the heater $a$ and its grate $p$ through the central opening in the upper ring or framing $f$ and open end of the heater $a$, the said openings being provided with a cover $q$, hinged to the upper ring $f$, and with a flue $r$, through which the waste products of combustion from the heater $a$ are carried off in either direction.

$s\ s$ represent T-shaped guide-bars, which are arranged vertically opposite to each other and secured at their upper flanged ends to the under side of lugs or projections $t$ therefor on the circumference of the lower ring or framing $f$. The lower ends of the bars $s$ are secured to the upper side of a flanged basering $u$, on which the platform $h$, when lowered, is supported. The central upright webs $s'$ of the bars $s$ engage in slots $s^2$, formed in the edge of the platform $h$, which is thereby maintained while being raised and lowered, with the cask $g$ in the proper position beneath the heater $a$. The fire being lighted in the heater $a$, and the barrel or cask $g$, with the platform $h$ and other parts of the apparatus in the positions shown in Fig. 1, on pulling down the counterbalance-weight $o$ and rope or chain $m$ the platform $h$, with the barrel $g$, will be raised by the cross-head $i'$ and rods $i$, and the barrel $g$, passing through the lower open end of the cylinder or drum $b$ and entering and occupying the annular space $c$, will surround the heater $a$, which in this position of the barrel $g$ projects through a central hole therefor in the platform $h$, and the heat from the heater $a$ circulating in the annular space $c$ acts upon the outside as well as the inside of the barrel $g$, so as to thoroughly dry the latter.

In raising the barrel $g$ to be heated as described the lower end of the annular space $c$ is closed by the platform $h$ coming in contact with the lower edge of a projecting ring $s'$, formed on the under side of the lower framing $f$ around the open end of the cylinder or drum $b$, whereby the heated gases from the annular space $c$ are prevented from escaping thereat into the air and compelled to pass through the lower openings $b'$ of the drum $b$ into the annular space $e$, and circulating upward through the latter finally pass out through the openings $d'$ of the outer casing $d$ into the external atmosphere, by which means the heated gases, being prevented from escaping too rapidly from the space $c$, their full effect is utilized for drying the barrel $g$, and consequently less fuel is required than when the gases are allowed to escape directly from the space $c$ into the air, as in the apparatus described in my said Letters Patent. Another advantage of this arrangement is that the escape of the gases is effected at a convenient height from the operator, instead of in proximity thereto, as heretofore.

I claim as my invention—

In apparatus for heating and drying barrels, the combination of the heater $a$, cylinder or drum $b$, having openings $b'$ near its lower end and forming annular space $c$, outer drum or casing $d$, having openings $d'$ near its upper end and forming annular space $e$, said drums being carried by framing $f$, with platform $h$ for carrying the barrel $g$, and means for raising and lowering said platform, substantially as shown, and for the purpose described.

In testimony whereof I affix my signature, in presence of two witnesses, this 24th day of October, 1888.

JAS. M. CHAMBERS.

Witnesses:
SARA L. SCHRADER,
PAUL BAKEWELL.